(12) United States Patent
Mahapatra et al.

(10) Patent No.: US 10,176,260 B2
(45) Date of Patent: Jan. 8, 2019

(54) MEASURING SEMANTIC INCONGRUITY WITHIN TEXT DATA

(71) Applicant: Regents of the University of Minnesota, Minneapolis, MN (US)

(72) Inventors: Amogh Mahapatra, Santa Clara, CA (US); Nisheeth Srivastava, Avon, CT (US); Jaideep Srivastava, Plymouth, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 481 days.

(21) Appl. No.: 14/618,838

(22) Filed: Feb. 10, 2015

(65) Prior Publication Data

US 2015/0227626 A1   Aug. 13, 2015

Related U.S. Application Data

(60) Provisional application No. 61/939,230, filed on Feb. 12, 2014.

(51) Int. Cl.
*G06F 17/30* (2006.01)
*G06F 17/27* (2006.01)

(52) U.S. Cl.
CPC .... *G06F 17/30864* (2013.01); *G06F 17/3053* (2013.01); *G06F 17/30315* (2013.01); *G06F 17/2785* (2013.01); *G06F 17/3069* (2013.01); *G06F 17/30321* (2013.01); *G06F 17/30663* (2013.01); *G06F 17/30684* (2013.01); *G06F 17/30731* (2013.01)

(58) Field of Classification Search
CPC ............. G06F 17/3069; G06F 17/2785; G06F 17/3053; G06F 17/30663; G06F 17/30684; G06F 17/30731; G06F 17/30321

USPC ........ 707/706, 708, 728, 737, 739, 748, 749
See application file for complete search history.

(56) References Cited

U.S. PATENT DOCUMENTS

| | | | |
|---|---|---|---|
| 6,523,026 B1 * | 2/2003 | Gillis | G06F 17/30637 |
| 7,672,952 B2 * | 3/2010 | Isaacson | G06K 9/627 707/999.01 |
| 8,719,257 B2 * | 5/2014 | Rangan | G06F 17/3069 707/718 |

(Continued)

OTHER PUBLICATIONS

Adomavicius et al., "Toward the Next Generation of Recommender Systems: A Survey of the State-of-the-Art and Possible Extensions," IEEE Transactions on Knowledge and Data Engineering, vol. 17(6), Jun. 2005, pp. 734-749.

(Continued)

*Primary Examiner* — Dangelino N Gortayo
(74) *Attorney, Agent, or Firm* — Shumaker & Sieffert, P.A.

(57) ABSTRACT

A computing device may determine, based at least in part on one or more semantic exemplars associated with a digital object, a level of incongruity for the digital object, and output an indication of the level of incongruity for the digital object. For instance, a system may provide a web application that can support hedonic web surfing. By modeling Internet users as active information foragers instead of random surfers, a system may obtain quantitative measures of digital objects that users may find psychologically stimulating. The system may utilize a quantitative measure of the conceptual incongruity of digital objects that may predict how interesting users will find an object.

29 Claims, 7 Drawing Sheets

(56) References Cited

U.S. PATENT DOCUMENTS

| | | | | |
|---|---|---|---|---|
| 8,892,484 B2* | 11/2014 | Sipple | G06N 5/02 | |
| | | | 706/21 | |
| 8,930,288 B2* | 1/2015 | Toderici | G06F 17/30799 | |
| | | | 706/12 | |
| 9,251,292 B2* | 2/2016 | Cheng | G06F 17/30979 | |
| 9,349,103 B2* | 5/2016 | Eberhardt, III | G06N 99/005 | |
| 9,454,602 B2* | 9/2016 | Misra | G06F 17/3071 | |
| 9,600,568 B2* | 3/2017 | Rangan | G06F 17/3069 | |
| 9,678,992 B2* | 6/2017 | Wang | G06F 17/30265 | |
| 2006/0036640 A1* | 2/2006 | Tateno | G06F 17/30997 | |
| | | | 707/999.102 | |
| 2007/0073745 A1* | 3/2007 | Scott | G06F 17/30737 | |
| 2013/0138665 A1* | 5/2013 | Hu | G06F 17/30731 | |
| | | | 707/749 | |
| 2014/0195518 A1* | 7/2014 | Kelsey | G06F 17/30539 | |
| | | | 707/722 | |
| 2014/0222719 A1* | 8/2014 | Poulin | G06N 5/04 | |
| | | | 706/11 | |
| 2014/0229482 A1* | 8/2014 | Milenova | G06F 17/30289 | |
| | | | 707/737 | |
| 2015/0186530 A1* | 7/2015 | Mansour | G06F 17/3087 | |
| | | | 707/706 | |

OTHER PUBLICATIONS

Kutas et al., "Reading Senseless Sentences: Brain Potentials Reflect Semantic Incongruity," Science, vol. 207, Jan. 1980, pp. 203-205.

Mahapatra et al., "Characterizing the Internet's Sense of Humor," IEEE International Conference Social Computing and ASE/IEEE International Conference on Privacy, Security, Risk and Trust (PASSAT), Sep. 2012, pp. 579-584.

Zhou et al., "Solving the Apparent Diversity-Accuracy Dilema of Recommender Systems," Proceedings of the National Academy of Sciences, vol. 107, Mar. 2010, pp. 4511-4515.

* cited by examiner

MEASURING SEMANTIC INCONGRUITY WITHIN TEXT DATA

This application claims the benefit of U.S. Provisional Patent Application No. 61/939,230, filed Feb. 12, 2014, the entire contents of which are incorporated herein by reference.

GOVERNMENT RIGHTS

This invention was made with government support under W911NF-09-2-0053 awarded by the Army, CNS-0931931 awarded by the National Science Foundation, and W911NF-12-C-0028 awarded by the Defense Advanced Research Projects Agency (DARPA). The government has certain rights in the invention.

BACKGROUND

Generally, when accessing content on a wide area network, such as the Internet, users may utilize a browser application. Browser mediated web experiences may be defined within a number of categories, such as (1) exploring the web independently via the address bar, wherein a user navigates to a website, explores the website, and then either subsequently clicks on a displayed hyperlink or types a new address altogether; (2) visiting favorite and/or previously visited websites; (3) sharing discovered web content with friends and thus benefiting from others' recommendations; or (4) using a search engine to find web content.

SUMMARY

By modeling Internet users as active information foragers instead of random surfers, techniques of the present disclosure may obtain quantitative measures of digital objects that the Internet users may find psychologically stimulating. As described herein, a quantitative measure of the conceptual incongruity of digital objects may be developed that strongly predicts how interesting users will find an object. Such measure may be used to demonstrate a web application that can support hedonic web surfing.

In one example, a method includes determining, by a computing device and based at least in part on one or more semantic exemplars associated with a digital object, a level of incongruity for the digital object, and outputting, by the computing device, an indication of the level of incongruity for the digital object.

In another example, a computing device includes means for performing any of the techniques described herein.

In another example, a computer-readable storage medium is encoded with instructions that, when executed, cause a processor to perform any of the techniques described herein.

The details of one or more examples are set forth in the accompanying drawings and the description below. Other features, objects, and advantages will be apparent from the description and drawings, and from the claims.

DETAILED DESCRIPTION

Techniques of the present disclosure may enable a computing system to leverage psychological theories of curiosity and interest in order to directly predict what objects a user might find interesting. For instance, the system may predict what web objects (e.g., web pages) the user would find intrinsically psychologically stimulating, using information derived from various other web browsing modalities, such as search, web history and social recommendations. The system may utilize an information-theoretic method to detect the most incongruous digital objects on the web using semantic exemplars (e.g., tags of a video, summary terms of a blog, or other data) associated with the given object and thereby predict user interest in web content. As further described below, such prediction can be verified by empirical results that suggest the measure of incongruity detection may significantly predict user interest. By instantiating this method, a computing system can be designed and implemented which aids exploratory surfing of the web.

Figure 1:
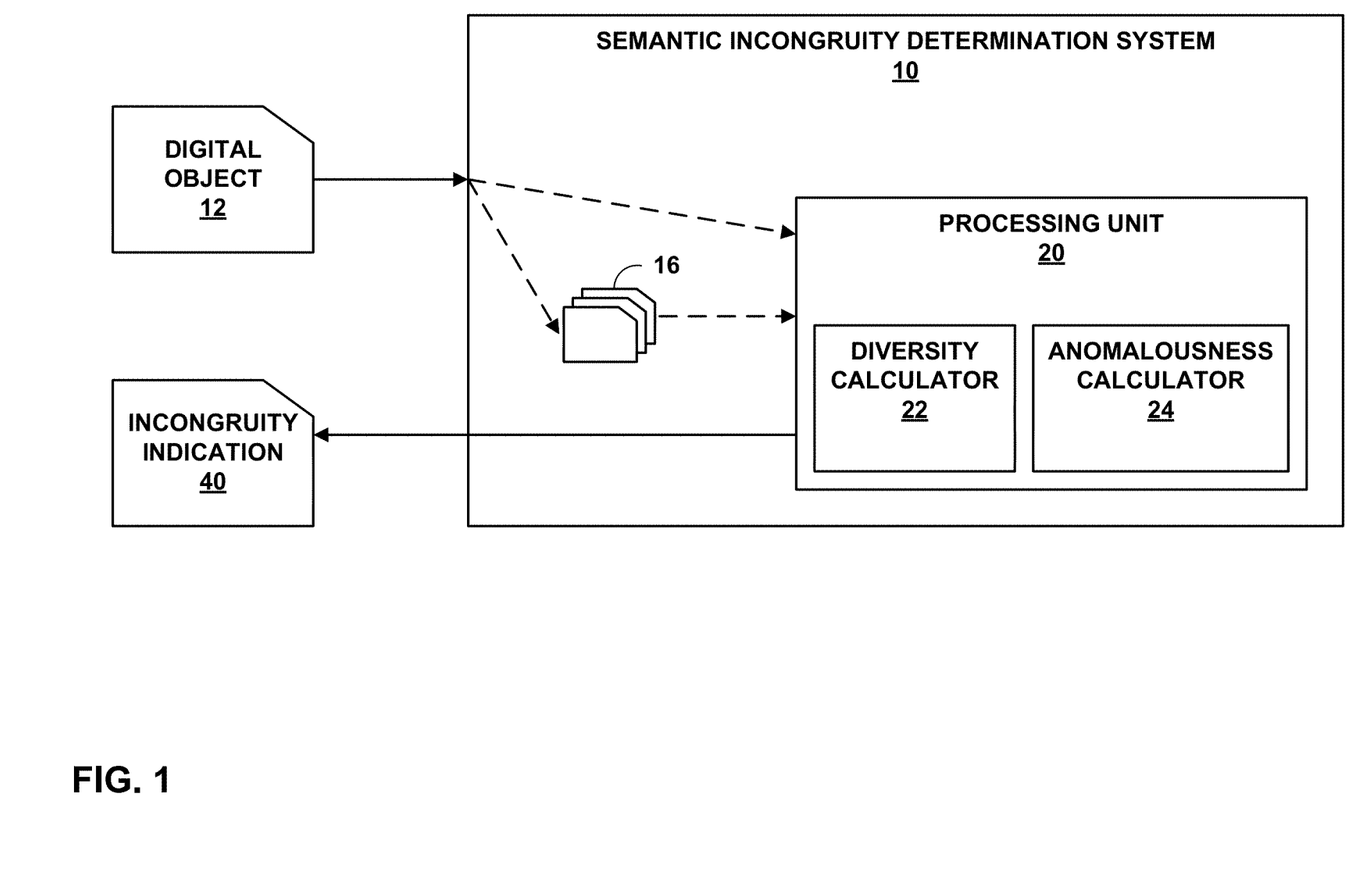
FIG. 1 is a block diagram illustrating an example semantic incongruity determination system in accordance with one or more techniques of the present disclosure.

FIG. 1 is a block diagram illustrating an example semantic incongruity determination system 10 ("system 10") in accordance with one or more techniques of the present disclosure. In the example of FIG. 1, system 10 may represent a computing device or computing system, such as a mobile computing device (e.g., a smartphone, a tablet computer, and the like), a desktop computing device, a server system, a distributed computing system (e.g., a "cloud" computing system), or any other device capable of performing the techniques described herein.

In the example of FIG. 1, system 10 accesses and processes digital object 12. Digital object 12 may represent any collection of digital data, such as a webpage, a video, an email, a text document, a picture, an audio file, or any other information. In some examples, system 10 may receive digital object 12 from an outside source, such as from a network connection (not shown). In other examples, digital object 12 may be stored at system 10, such as in a storage device of system 10 (not shown).

In some examples, system 10 may receive one or more semantic exemplars associated with digital object 12. A semantic exemplar may be a descriptor or other text data, e.g., meta data, that describes or represents the associated digital object. As examples, semantic exemplars may be words from a webpage (or metadata of the webpage), tags for a video, tags for a picture, words from an email or text document (or metadata of the email or text document), lyrics or tags for a song, or other descriptors. That is, a semantic exemplar may be any information usable to describe the content of, the meaning of, the context of, or other aspect of a digital object with which the semantic exemplar is associated. In other examples, system 10 may determine the one or more semantic exemplars to associate with a received digital object. For instance, system 10 may perform various language processing techniques to determine words, tags, or other information that describes the content of the digital object. As one example, system 10 may perform natural language processing techniques to extract a set of semantic exemplars from a webpage.

System 10, in the example of FIG. 1, includes processing unit 20. Processing unit 20, in turn, contains diversity calculator 22 and anomalousness calculator 24. Each of processing unit 20, diversity calculator 22 and anomalousness calculator 24 may be software, firmware, hardware, or some combination thereof. System 10 may provide digital object 10 and/or associated semantic exemplars 16 to processing unit 20.

Processing unit 20, in the example of FIG. 1, may determine a semantic space consisting of semantic exemplars 16. A semantic space may be a representation of included semantic exemplars that allows similarities and differences in the semantic space to be quantified. For instance, a semantic space may allow components of system 10 to determine a level of similarity between pairs of semantic exemplars 16.

In the example of FIG. 1, diversity calculator 22 may calculate a level of diversity among semantic exemplars 16. The level of diversity may represent how different the subject matter is within a set of semantic exemplars. In some examples, diversity calculator 22 may use the determined semantic space to determine the diversity. For instance, if all of semantic exemplars 16 deal with the same, very specific subject, diversity calculator 22 may determine a very low level of semantic diversity. Conversely, if semantic exemplars 16 include terms dealing with a wide range of subjects, diversity calculator 22 may determine a higher level of semantic diversity.

Anomalousness calculator 24, in the example of FIG. 1, may calculate a level of semantic anomalousness among semantic exemplars 16. The level of anomalousness may indicate the existence or non-existence of outliers within a set of semantic exemplars. In some examples, anomalousness calculator 24 may use the determined semantic space to determine anomalousness. For instance, if a single semantic exemplar of semantic exemplars 16 is discussing a very different subject than others of semantic exemplars 16, anomalousness calculator 24 may determine a high level of semantic anomalousness. Conversely, if semantic exemplars 16 contain semantic exemplars that are all relatively close to one another in the semantic space and no semantic exemplar is very different from the others, anomalousness calculator 24 may determine a lower level of semantic anomalousness.

Processing unit 20 may obtain a level of semantic diversity from diversity calculator 22 and a level of semantic anomalousness from anomalousness calculator 24. Based on the diversity and anomalousness of semantic exemplars 16, processing unit 20 may determine a level of incongruity for digital object 12. In some examples, the level of incongruity may be determined based only on the diversity and anomalousness of semantic exemplars 16. In other examples, the level of incongruity may be based on determined levels of diversity and anomalousness for other digital objects (not shown).

In any case, processing unit 20 may provide at least an indication of the level of incongruity for digital object 12, and system 10 may output incongruity indication 40 or otherwise take a programmatic response based on the level of incongruity. In some examples, incongruity indication 40 may be data output for display (e.g., at a display device). In other examples, incongruity indication 40 may be a report output for review, such as by a user or administrator of system 10.

By determining a level of incongruity for a digital object, system 10 may predict how interesting the digital object may be to a user. For instance, system 10 may determine the level of incongruity of a webpage to predict whether or not a user will find the web page interesting or entertaining. As another example, system 10 may determine the level of incongruity of an email to determine whether the email contains abnormal or interesting subject matter. As yet another example, system 10 may determine the level of incongruity of advertisements to determine which might be more appealing to consumers. System 10 may be used in various other applications in accordance with the techniques described herein.

Figure 2:
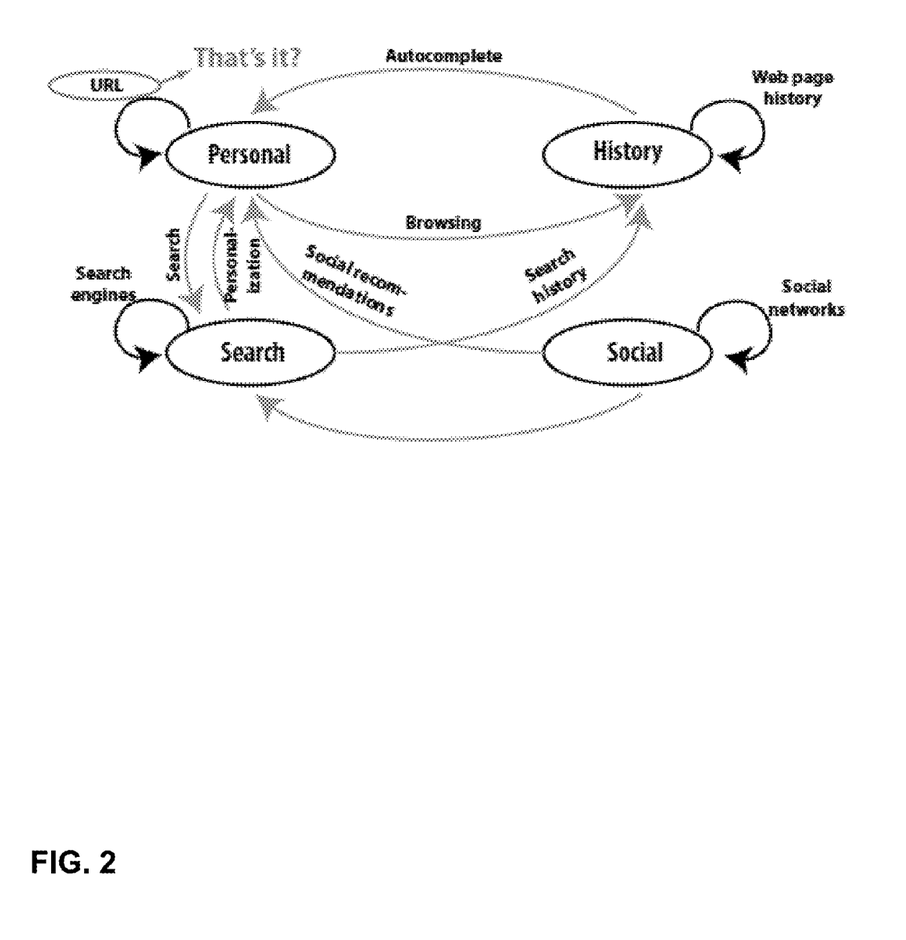
FIG. 2 is a schematic diagram illustrating the modalities of browsing the web and the technologies that enable each, in accordance with one or more techniques of the present disclosure.

FIG. 2 is a block diagram providing a schematic description of the modalities of browsing the web and the technologies that enable each, in accordance with one or more techniques of the present disclosure. Generally, when accessing content on a wide area network, such as the Internet, users may utilize a browser application. Browser mediated web experiences may be defined within a number of categories, such as (1) exploring the web independently via the address bar, wherein a user navigates to a website, explores the website, and then either subsequently clicks on a displayed hyperlink or types a new address altogether; (2) visiting favorite and/or previously visited websites; (3) sharing discovered web content with friends and thus benefiting from others' recommendations; or (4) using a search engine to find web content. These categories are identified in the example of FIG. 2 as four primary sources of guidance for people browsing the web.

In the example of FIG. 2, a number of technologies that support the four categories of web experiences are shown. For instance, some technologies may be used within a category in order to support that category individually, such as search engines, social networks, web page history, web links (e.g., URLs), or other technologies. As one example, with regard to category (2), some web browsers may be operable to facilitate visiting favorite and/or previously visited websites by allowing a user to access stored history and providing bookmark functionality. That is, the user may retrieve previously visited pages from his or her history and select a set of pages (e.g., pages that he or she visits frequently) to load each time the browser is initialized. As another example, with regard to category (4), various search engines have emerged to assist users in finding web content by employing complex and specialized algorithms. In the future, the connection between natural language and relevant web results may become increasingly more automated as search engines improve in their capabilities and users become more familiar with search engine use. With regard to category (3), sharing discovered content has also become easier as technology, such as web 2.0, continues to better facilitate the sharing of media content with other people, and the use of other peoples' preferences for digital objects as guides to a user's likely future preference.

Various technologies may be used, in the example of FIG. 2, to facilitate communication between the four categories of web experiences. As such, advances in categories (2), (3) and (4) described above may be used to indirectly contribute to enhancing independent exploration (e.g., category (1)). For instance, improved tagging, voting and other collaborative filtering methods may enable users to select objects of potential interest. In another example, links sent directly or recommended via social network services (e.g., Facebook or Twitter) may form a major component of a user's web browsing experience. In yet another example, tailoring search (e.g., by adapting to a user's history of search and browsing) may connect history of sites visited by a user in the past to future browsing, as mediated via search engines. However, when it comes to the task of independently exploring the web technology has yet to offer users new ideas beyond user interface (UI) improvements. That is, the fundamental atom of web experience—the individual surfer performing typically goalless exploration of the web—is still modeled as random. Such modeling may be the result of users' personal preferences being assumed to be idiosyncratic.

Techniques of the present disclosure provide a system (e.g., system 10 of FIG. 1) that may leverage psychological theories of curiosity and interest in order to directly predict what web objects a user might find intrinsically psychologically stimulating, using information derived from any of the other three modalities: search, web history and social recommendations. The system described herein may technologically mediate category (1) operation by modeling users as hedonic information foragers rather than as random surfers. By operationalizing current ideas in cognitive psychology about the role of incongruity in triggering interest in incoming stimuli, the techniques of this disclosure may better predict the intrinsic interestingness of digital objects.

Potentially due in part to the brain being constantly deluged by an incessant torrent of stimuli, it has evolutionarily developed ways of responding selectively to those stimuli that the brain considers important. Prominent among the environmental signals that the brain has adapted to preferentially respond to is a sense of environmental incongruity. That is, the human brain may prioritize or more quickly comprehend the onset of an environmental cue that appears out of place within the current world context that the brain infers its organism to be in. Such cues may be information-rich. For instance, the cues may signal massive changes in the environment, and therefore trigger the interest of hedonic information foragers (e.g., people who are trying to find things simply for the pleasure of finding things out).

Figure 3:
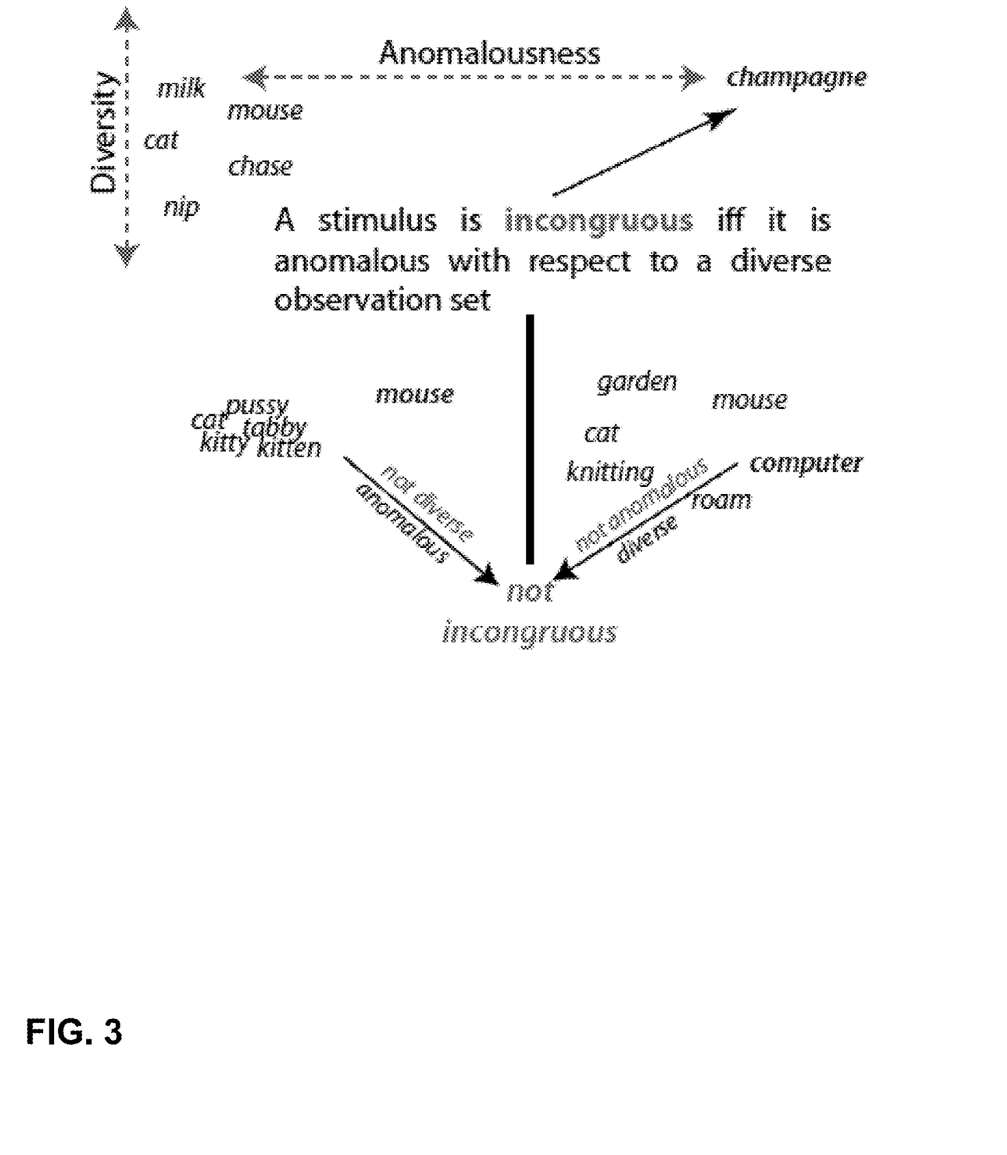
FIG. 3 is a flow diagram illustrating incongruity as a combination of diversity and anomalousness in semantic space, in accordance with one or more techniques of the present disclosure.

FIG. 3 is a flow diagram illustrating incongruity as a combination of diversity and anomalousness in semantic space, in accordance with one or more techniques of the present disclosure. In some examples, diversity and anomalousness may be used to concretely objectify a subjective concept like "interestingness" in the domain of natural language. That is, as in the cognitive observations discussed above, a user's interest may be triggered by the perception of incongruous stimuli. By building upon this idea, techniques of the present disclosure condense the problem to identifying incongruous media objects as potential triggers of interest.

For instance, given a set of media objects M, let every constituent member $M_i$ be associated with a set of words $E_i$. Words which have a high statistical co-occurrence frequency may be likely to have shared common contexts in the past and thus their future co-occurrence may not be surprising. Hence, semantic incongruity may result from unpredictable co-usage of terms. For $M_i$ to be incongruous and hence interesting, the set $E_i$ must show a greater degree of unpredictability compared to the other members of M.

As shown in the Example of FIG. 3, two conditions may be relevant in operationalizing unpredictability. First, the existence of situational contexts that are predictively non-trivial may contribute to unpredictability, because such contexts contain a diverse set of concepts, thereby increasing semantic diversity. Secondly, the presence of conceptual anomalies may increase semantic anomalousness thereby also contributing to unpredictability. In other words, word sets that have too little semantic diversity may be likely to be sets of synonyms or mundane lists that are unlikely to be interesting to a user, even if anomalous entries do show up. Conversely, diverse word sets with no marked anomalies may just appear noisy instead of incongruous, and thus diverse but non-anomalous word sets may also be unlikely to be interesting to a user.

Scenarios suggested by the word clouds of FIG. 3 may verify this determination. For instance, numerous synonymous references to a cat, as well as a single reference to a mouse may not provide sufficient diversity to be incongruous (e.g., interesting). Similarly, diverse set of words identifying a cat, a mouse, a computer, knitting, and other topics may have sufficient diversity, but may lack sufficient incongruity. The scenario depicted by the words shown at the top in the example FIG. 3, however, may appear to be more intrinsically interesting than the ones below. That is, a scenario involving a cat, a mouse, a chase, a nip, and champagne may be sufficiently diverse and sufficiently anomalous to be considered incongruous.

In order to quantify the semantic space of words, a system operating in accordance with the techniques described herein (e.g., system 10 of FIG. 1) may use a co-occurrence based similarity measure between any two words. One example similarity measure may be based on the number of results returned by a search engine when searching for each of the words separately and the words together. For instance, given two words, x and y, a Normalised Google Distance (NGD) between the two words can be defined by equation 1. In equation 1, f(x) and f(y) may denote the number of search results returned by Google's search engine when searching for x and the number of search results returned by Google's search engine when searching for y, respectively. Similarly, f(x,y) may denote the number of search results return by Google's search engine when searching for both x and y together. N may denote the total number of pages indexed by Google.

$$NGD(x, y) = \frac{\max(\log f(x), \log f(y)) - \log(f(x, y))}{\log N - \min(\log f(x), \log f(y))} \quad (1)$$

By leveraging a search engine that has indexed (and continue to index) a vast portion of the Internet, NGD may provide the relatedness between any two terms based on their co-occurrence in the entire World Wide Web. While the present example is described as determining co-occurrence using the Google search engine, various other search engines or methods may be used to determine the relatedness between any two terms in accordance with the techniques described herein. In other words, for each pairwise combination of the semantic exemplars, the pairwise combination including a first semantic exemplar and a second semantic exemplar, the respective measure of similarity between the pairwise combination may be determined by accessing an index generated based on a set of resource objects and computing, using the index, a respective co-occurrence, in the set of resource objects, of the first and second semantic exemplars. The range of the NGD measure is $(0,\infty)$, where 0 indicates complete similarity between two words or phrases and co indicates complete dissimilarity between the two words or phrases. As can be deduced from Equation 1, NGD is symmetric (e.g., NGD(a,b)=NGD(b,a)) and is not a metric. Thus, triangle inequality may not always be satisfied. However, analysis in the non-metric space can be simplified in order to utilize learning techniques that may work on metric spaces.

In order to simplify analysis in the non-metric space, system 10 may first create a similarity matrix. As one example, let I denote a set of words (or concepts) I={$i_1, i_2, \ldots, i_n$} where $i_k$ is the $k_{th}$ word. The cardinality of the set I is assumed to be n. System 10 may then construct a n*n matrix where each entry of the matrix is the NGD between any two words ($i_1,i_2$). The resulting matrix is symmetric in nature.

Diversity may indicate the presence of some context in the data that is non-trivial to predict. That is, diversity may indicate the presence of a loosely knit sense-cluster. For example, let S denote a given similarity matrix. In such case, least absolute deviation can be used to measure the diversity of S. Equation 2 defines least absolute deviation. In order to account for the possibility that the number of words varies from set to set, the resulting diversity of S may be normalized with the cardinality of the word set in each case. Computing the least absolute deviation may, in some examples, represent identifying a minimum measure of similarity (e.g., a minimum co-occurrence value or NGD value) such that, for at least one semantic exemplar from the one or more semantic exemplars, the respective measure of similarity between each pairwise combination that includes the at least one semantic exemplar is less than or equal to the minimum measure of similarity. That is, within the similarity matrix, computing the least absolute deviation may be one way to determine the smallest co-occurrence value such that, for a particular semantic exemplar (e.g., a particular row or column), all semantic exemplars (e.g., all values in the row or column) are less than the determined co-occurrence value.

$$D_a=\min_j|\Sigma_{i=1}^n S(i,j)| \quad (2)$$

The presence of an anomaly or anomalies in the semantic space may indicate a deviation from the context. After creating the similarity matrix, system 10 may first compute the sum of deviations of each word from all the other words in a given set of words. The cumulative divergence score $d_i$ for the $i_{th}$ word from all the other words in the set can be determined using equation 3. After obtaining the divergence scores; $d_i$ for all the words, the problem reduces to finding the most deviant points from this set. In one example, a well-known non-parametric technique—the inter-quartile measure—may be used to determine the most deviant points from the set. The inter-quartile measure is summarized in equation 4. In equation 4, Q1 may denote the first quartile, Q3 may denote the third quartile, and IQR may represent the interquartile range. The variables UB and LB may denote the upper and lower bounds of the data, respectively. System 10 may determine any points lying outside the ranges specified by equation 4 as anomalies within the set.

$$d_i=\Sigma_{j=1}^n S(i,j) \quad (3)$$

$$LB=Q1-1.5*IQR; UB=Q3+1.5*IQR \quad (4)$$

After obtaining an anomaly score for a given set, system 10 may normalize the anomaly score of a set by its cardinality. As one example of normalizing the anomaly score, system 10 may determine the number of points (e.g., words) outside the upper and lower bounds of the data (e.g., $n_1$ and $n_2$, respectively). System 10 may also determine the total number of words in the set, n. The anomalousness score can then be obtained by determining (n1+n2)/n.

In accordance with the techniques described herein, incongruity may be defined as the joint presence of diversity and anomalousness. To quantify the simultaneous presence of both diversity and anomalousness, the system described herein may combine the individual scores of diversity and anomalousness using a number of possible methods. One such method is a positional rank aggregation technique called Borda. The use of rank aggregation instead of algebraic combination may avoid any potential issues regarding parameterization and may ensure that scaling does not affect analysis in any way. Given a set of ranked lists, L={$l_1, l_2, \ldots, l_n$}, system 10 may use the Borda method to assign a score Score$_i$(k) to each candidate in $l_i$. The assigned score represents the number of candidates ranked below the scored candidate in the particular list. System 10 may then determine a final score for each candidate by calculating the sum of all the scores generated for the candidate across the entire set of ranked lists. System 10 may then sort the scores in decreasing order to find the highest ranking candidates. For example, given a set of ten objects, an object that is the second most diverse (e.g., having eight elements below it) and is the sixth most anomalous (e.g., having four elements below it) may have an incongruity score of 8+4=12. A second object that is slightly less diverse (e.g., having seven elements below it) but significantly more anomalous (e.g., having eight elements below it) may have an incongruity score of 7+8=15.

Figure 4:
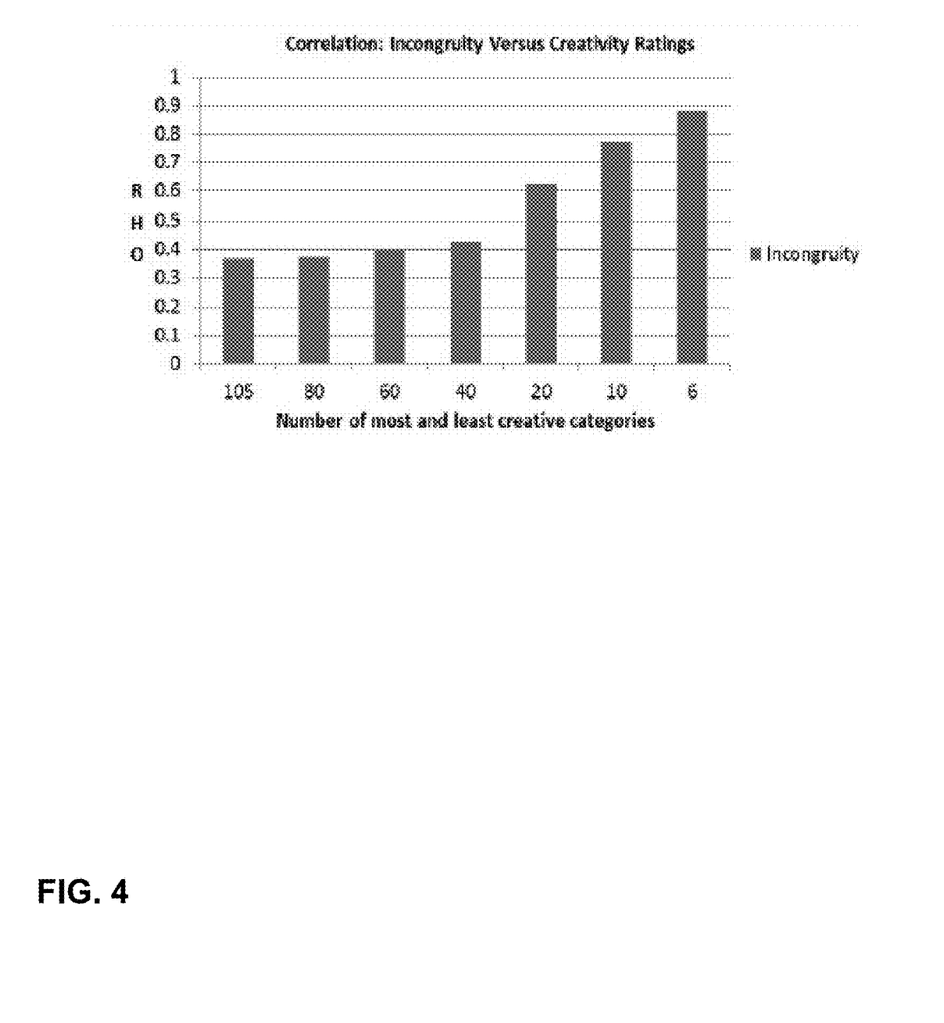
FIG. 4 is a bar chart illustrating the correlation between a number of subject categories and their creativity ratings, in accordance with one or more techniques of the present disclosure.

FIG. 4 is a bar chart illustrating the correlation between a number of subject categories and their creativity ratings, in accordance with one or more techniques of the present disclosure. The data depicted in the example of FIG. 4 is a result of investigation conducted by the system described herein (e.g., system 10 of FIG. 1) on a human constructed data-set. The data-set consists of 105 subject categories constructed by a first set of human subjects, with each category consisting of a set of words surrounding a central theme (e.g., bulb, humans, super natural events, and others). These categories have also been rated (by a second set of human subjects) to determine the amount of creativity required to come up with each category. As such, the data-set may provide an accurate measure of creativity as defined by humans.

By applying the techniques of the present disclosure to the data-set, system 10 may determine whether conceptual incongruity correlates with human-defined creativity. That is, the system described herein may be authenticated by applying the techniques of the present disclosure to a human-created data-set to calculate the incongruity score for each of the subject categories.

The example of FIG. 4 shows the correlation between the categories and the creativity ratings. The X-axis denotes the number of categories and the Y-axis denotes the values of Spearman's ρ. In the example of FIG. 4, system 10 operates on seven different subsets of the data: a first subset that contains the three most and the three least creative categories (e.g., a total of six) from the 105 subject categories, a second subset that contains the five most and five least creative categories (e.g., a total of ten), and so on until the final subset which contains all 105 subject categories. The bar chart shown in the example of FIG. 4 describes the correlation between the incongruity score against data subset size. As shown in the bar chart, the correlation between creativity ratings and incongruity keeps increasing as the number of categories is decreased, which may indicate a monotonic relationship: the most creative categories may have high semantic incongruity and the least creative categories may have low semantic incongruity. As shown in the example of FIG. 4, the correlation values for the cluster containing 6 and 10 categories are as high as 0.8873 and 0.7701, respectively. This may demonstrate the predictive power of the techniques described herein and may suggest that the most incongruous suggestions are very likely to be the most interesting ones.

Figure 5:
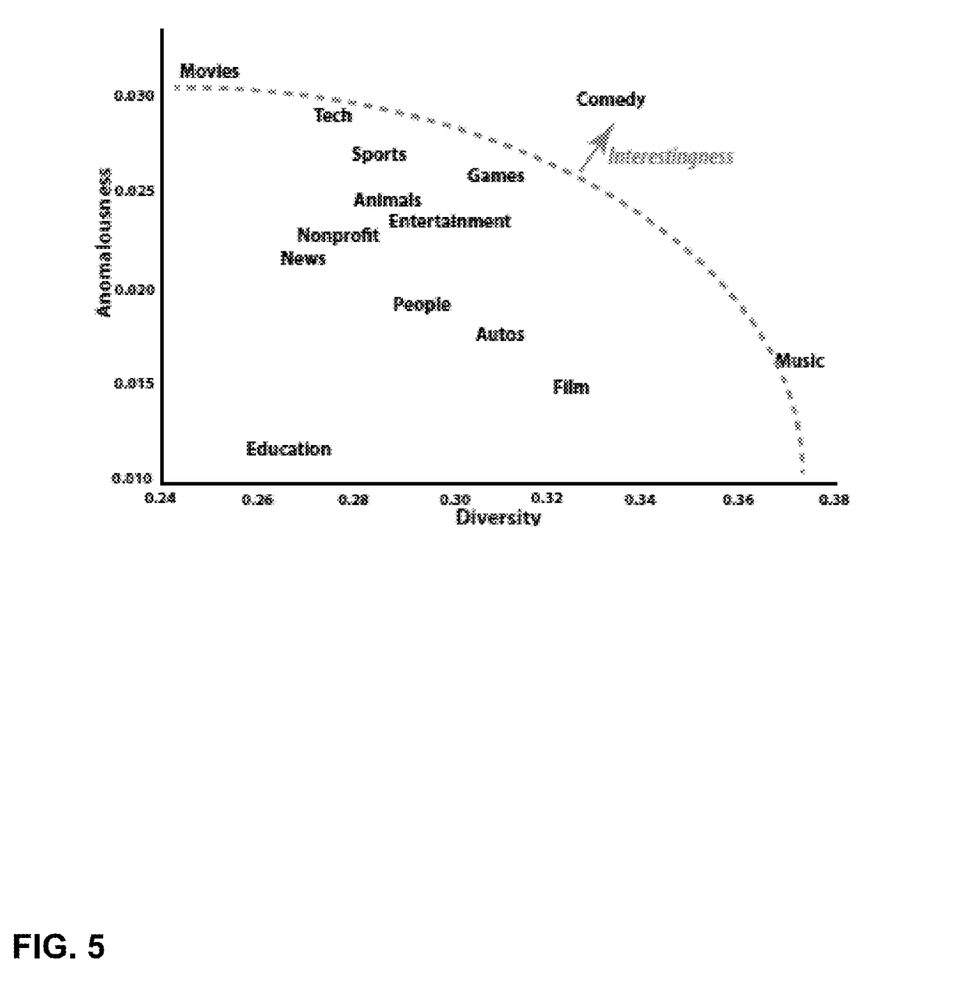
FIG. 5 is a two-dimensional plot showing video categories mapped according to average diversity and anomalousness scores, in accordance with one or more techniques of the present disclosure.

FIG. 5 is a two dimensional plot showing video categories mapped according to average diversity and anomalousness scores, in accordance with one or more techniques of the present disclosure. The data shown in the example of FIG. 5 may be obtained by applying the techniques described herein to a human annotated data-set consisting of 14,000 videos (e.g., 1000 videos each from 14 categories available on YouTube). Every video is accompanied with a set of tags, which may serve as a set of semantic exemplars that describe the content of the video and may be used to derive the conceptual context of the video.

The plot shown in the example of FIG. 5 displays the mean diversity and anomalousness scores for each of the 14 categories. As described herein, the intrinsic interestingness of a category may increase as the distance from the origin increases, approximately along the x=y axis (sensitive to scaling effects). The example of FIG. 5 may graphically illustrate the efficacy of the system described herein (e.g., system 10 of FIG. 1), as categories like comedy, games are predicted to have more intrinsically interesting videos than, for instance, education and non-profit videos. The example of FIG. 5 may also illustrate that techniques of the present disclosure can use semantic exemplars (e.g., tags or other meta data) to make suggestions not just about text objects, but about diverse media objects like movies, videos, music, and the like. That is, the range of applications for the techniques described herein may extend far beyond text objects to incorporate numerous other digital objects or objects having available semantic exemplars. The social web's emphasis on tagging may continue to enable processing additional object types in the future.

Figure 6:
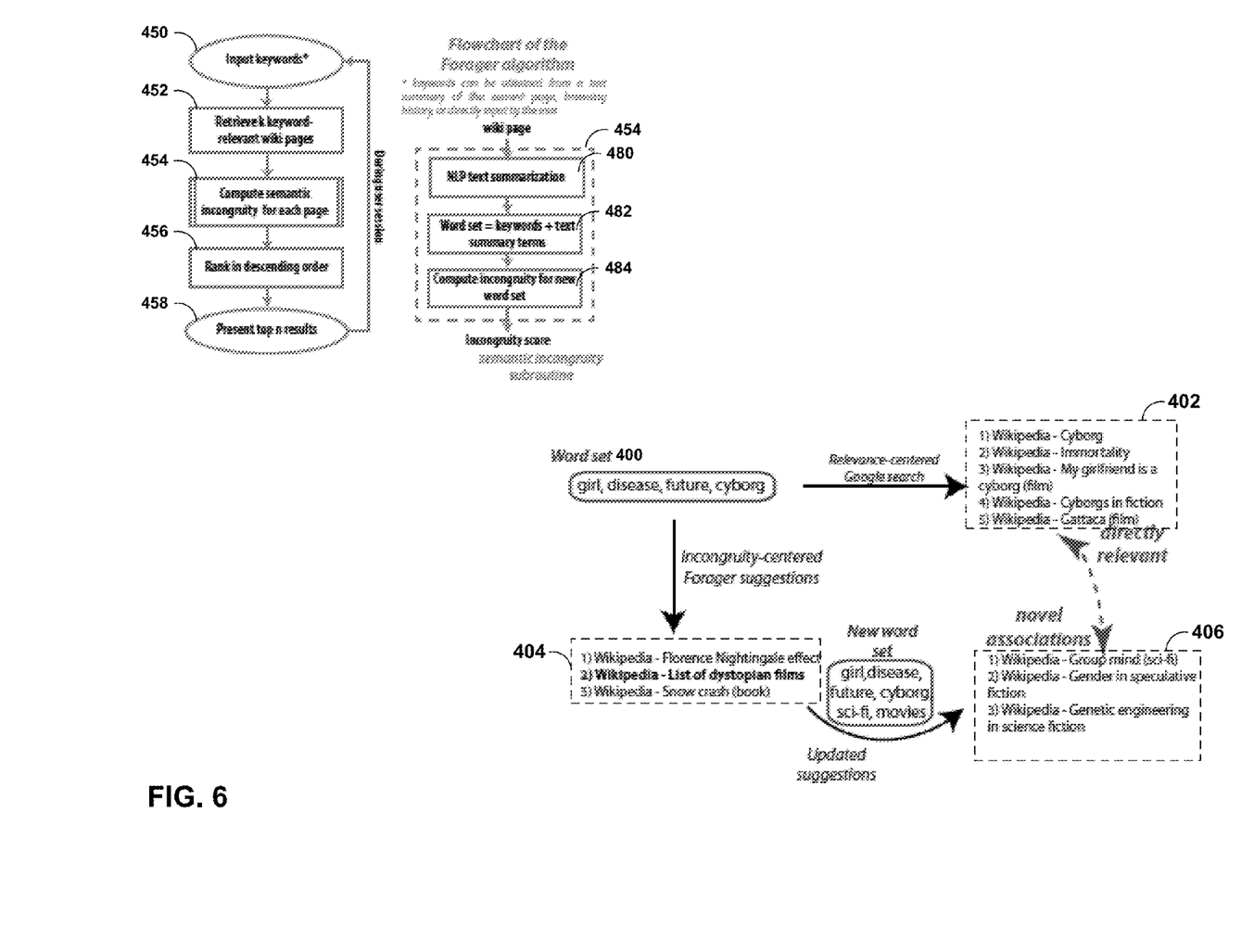
FIG. 6 is a block diagram illustrating an example flow chart and example results of a web forager, in accordance with one or more techniques of the present disclosure.

FIG. 6 is a block diagram illustrating an example flowchart and example results of a web forager, in accordance with one or more techniques of the present disclosure. For instance, the flowchart and results of FIG. 6 may describe the implementation and execution of an application (e.g., a web app) that operationalizes the central idea described herein of incongruity based content recommendations within the space of an Internet domain, such as Wikipedia. The left side of FIG. 6 displays a flowchart of an algorithm designed to make Wikipedia browsing recommendations. The right side of FIG. 6 steps through a use case, where a browser (e.g., a user) follows suggestions from the application through two iterations. In contrast to results obtained from purely relevance-centric traditional search engines, the results received from the forager application combine keyword-relevance with conceptual diversity and novelty that hedonic information foragers will likely appreciate.

The example of FIG. 6 demonstrates only one example implementation of web foraging as a Wikipedia browsing assistant, and many other examples of foraging and/or incongruity detection are within the scope of the present disclosure. The example of FIG. 6 describes how a system configured in accordance with the techniques described herein (e.g., system 10 of FIG. 1) may help a user to navigate a huge knowledge base such as Wikipedia by making suggestions that he or she would likely find interesting.

In the example of FIG. 6, a test user (e.g., hereinafter referred to using the pseudonym "Alice") may explicitly or implicitly provide word set 400, which includes the following keywords: girl, future, disease, cyborg. That is, the forager may receive input keywords (450). Given {k, n} (e.g., two values that may be previously configured or specified by the test user), the Forager application may first find k keyword-relevant search results (452). For instance, the application may use an information retrieval engine to retrieve the set of k most relevant Wikipedia pages related to the given keywords. That is, in order to determine keyword-relevant objects, the Forager application may provide the keywords to a search engine or other system to obtain the relevant results. The most relevant pages returned by popular search engines (e.g., Google, Bing, and others), using a combination of the keywords provided by Alice (as well as the added criteria "site:wikipedia.org"), are shown at the top right in FIG. 6, as results 402. These results may be topical and relevant with respect to the user-generated word set and highlight the principal advantages of a classical relevance-centered search.

The Forager application, in the example of FIG. 6, may find the most incongruous (and thereby interesting) pages among the obtained relevant pages. In order to find the most incongruous pages, the Forager application may determine incongruity for each page (454). To determine the incongruity, the Forager application may first develop a word set that represents each page (e.g., the retrieved relevant pages). For example, the application may apply NLP summary techniques to a page to determine a set of text summary terms for the page (480). The application may then determine a word set for the page by adding the keywords to the text summary terms, in order to ensure that the determined incongruity of each page includes the subject or subjects that Alice had indicated as important (482). The application may then compute the incongruity for the page by applying the techniques described herein to the word set (e.g., the semantic exemplars) associated with the page (484). In one example, the application may rank the k relevant results in order of descending incongruity (456).

In the example of FIG. 6, the Forager application may present the top n results (e.g., the results having the most incongruity) as potentially interesting relevant suggestions (458). That is, from the k relevant search results, the Forager application may output at least an indication of n "interesting" results. In some examples, outputting the indication may constitute outputting the n results for display (e.g., at a display device).

The top three incongruous, relevant Wikipedia pages obtained by the Forager application are displayed as results 404, on the right side of FIG. 6 for comparison to the classical, relevance-centered search results. The first interesting relevant result is "Florence Nightingale Effect", used to describe romantic feelings experienced by caregivers for patients, apparently referenced in the sci-fi movie "Back to the Future". This suggestion was high on both diversity and anomalousness scores. It may be diverse because its summary terms generate a loosely knit cluster when put together with the seed terms. Additionally, it is also anomalous because of multiple popular culture references within the article. The second suggestion is a page about a list of dystopian movies, which is directly relevant to the search, but may have incongruous content on account of being a list. The third suggestion is a page about a sci-fi book called "Snow Crash", an award-winning book about a firmware programming language for the brain-stem. There are female characters in the book which work like computer viruses—an exceptionally creative result given the semantic exemplars of the input word set.

The Forager application, in the example of FIG. 6, may receive an indication of input indicating a selection of one of the Forager results. For instance, Alice may click on the second suggestion (e.g., the list of dystopian films). Based on this selection, the application may utilize an online learning paradigm to incorporate the feedback received by the user based on his choices and quality of experience. For instance, the application may add a few new terms (e.g., science, fiction, movies) to the original seed (e.g., the original set of keywords). In this way, the techniques of the present disclosure may incorporate a user's feedback and adapt to the user's taste. The Forager application may determine words to add to the seed as keywords by using NLP summary techniques or using other methods on the selected object. That is, in various examples, keywords may be user supplied or may be inferred from objects or other sources.

In the example of FIG. 6, the Forager application may again obtain k relevant results, determine the incongruity of each of the relevant results, and output an indication of the top n incongruous, relevant results. The first three incongruous, relevant results are shown in the bottom right corner of FIG. 6 as results 406. For example, the first result is a page about the concept of the "Group Mind", an idea that references concepts across biology, physics and pop-culture. The Group Mind result may be shown because it was score highly in both diversity and anomalousness.

After reviewing the second set of results, Alice may click on the first suggestion (e.g., the Group Mind page) and a few new terms (e.g., cognition, video games, and others) may get added to the seed. This process can continue ad libitum. In some examples, the new terms obtained from a selection may be added to the original seed (e.g., replacing previously added terms). In other examples, the new terms may be added to the most recently used seed (e.g., appending new terms each time). In such example, as the keyword list slowly becomes unwieldy, the least recently used terms may be discarded heuristically.

While there may not be an objective way to judge the quality of the results, the results of the techniques described herein may suggest more psychologically satisfying material for a user who is not explicitly looking for a particular piece of information, but instead is simply seeking to "browse" Wikipedia, than those from standard search engines.

The techniques described herein provide a method of measuring the semantic incongruity of digital objects, and provide evidence that the semantic incongruity of an object may predict the perceived interestingness of the object. As one example, the techniques of this disclosure may be applied to a web application to assist Wikipedia browsing. A system configured in accordance with the techniques described herein may neatly counterbalance the current trend in web recommenders towards providing only topically relevant suggestions. That is, by introducing conceptual diversity in a principled manner into recommendations, a system using the techniques of the present disclosure may create the possibility of supporting the hedonic information foraging of digital natives, which in turn may generate possibilities for retaining user interest in web platforms that move traffic primarily through purveying digital media objects. While the techniques described herein are discussed in the context of web browsing, determination of incongruity among digital objects may also be useful in various other contexts. For example, content providers in other content discovery domains including security, analysis, advertising, entertainment, e-commerce, and others may apply the techniques of this disclosure to determine incongruous content, determine what consumers may find interesting, determine what users find entertaining, or a number of other purposes.

Figure 7:
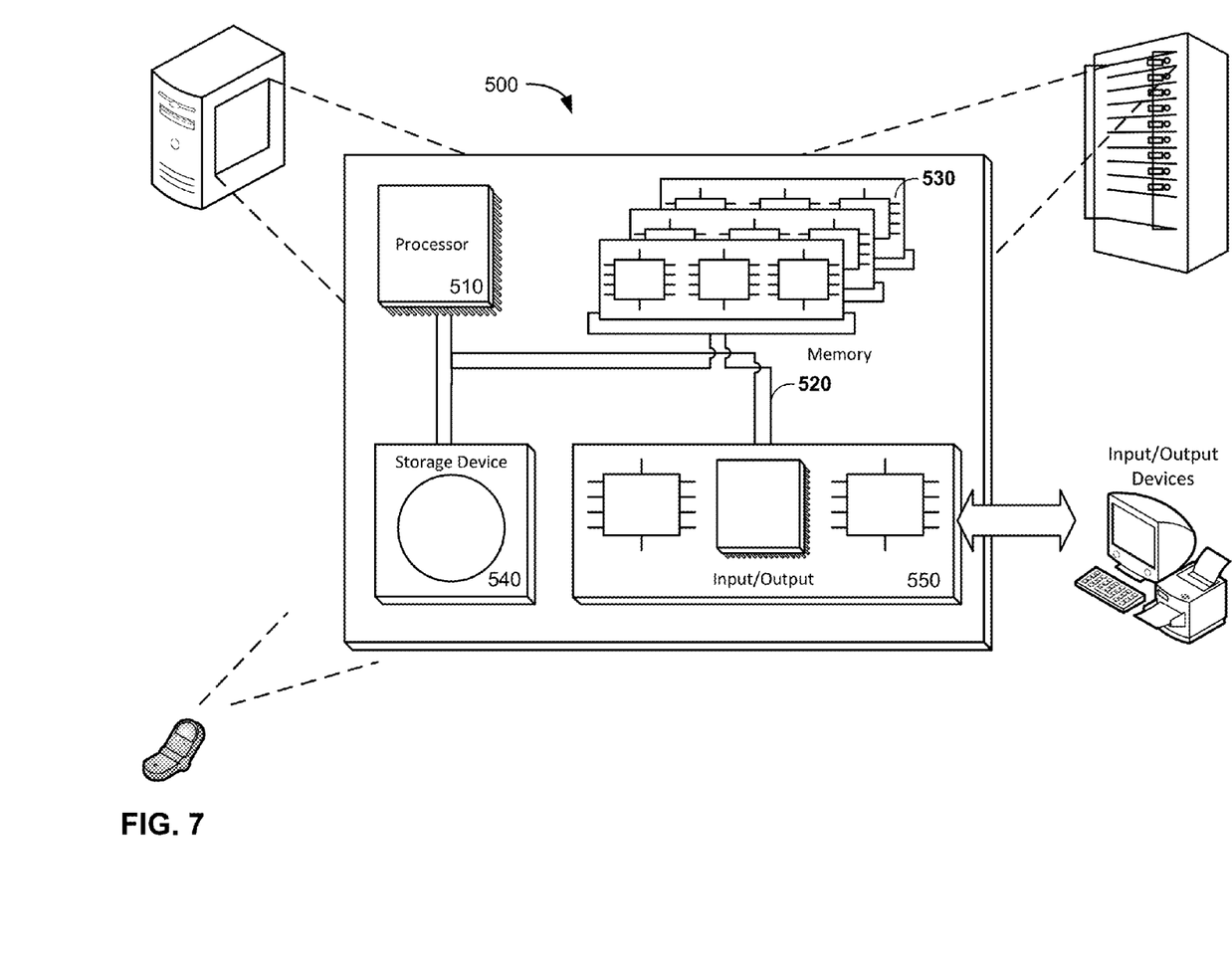
FIG. 7 is a block diagram illustrating a detailed example of various devices that may be configured to implement some embodiments in accordance with the current disclosure.

FIG. 7 is a block diagram showing a detailed example of various devices that may be configured to implement some embodiments in accordance with the current disclosure. For example, device 500 may be a mobile web forager platform, a mobile phone, a workstation, a computing center, a cluster of servers or other example embodiments of a computing environment, centrally located or distributed, capable of executing the techniques described herein. Any or all of the devices may, for example, implement portions of the techniques described herein for semantic incongruity determination.

In this example, a computer 500 includes a processor 510 that is operable to execute program instructions or software, causing the computer to perform various methods or tasks, such as performing the techniques for determining semantic incongruity as described herein. Processor 510 is coupled via bus 520 to a memory 530, which is used to store information such as program instructions and other data while the computer is in operation. A storage device 540, such as a hard disk drive, nonvolatile memory, or other non-transient storage device stores information such as program instructions, data files of the multidimensional data and the reduced data set, and other information. The computer also includes various input-output elements 550, including parallel or serial ports, USB, Firewire or IEEE 1394, Ethernet, and other such ports to connect the computer to external devices such a printer, video camera, surveillance equipment or the like. Other input-output elements include wireless communication interfaces such as Bluetooth, Wi-Fi, and cellular data networks.

The computer itself may be a traditional personal computer, a rack-mount or business computer or server, or any other type of computerized system. The computer, in a further example, may include fewer than all elements listed above, such as a thin client or mobile device having only some of the shown elements. In another example, the computer is distributed among multiple computer systems, such as a distributed server that has many computers working together to provide various functions.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media, which includes any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable storage medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
processing, by a computing device, textual data associated with a digital object to identify within the textual data one or more semantic exemplars for the digital object;
generating, by the computing device, a data structure that represents a semantic space of semantic diversity and semantic anomalousness for the digital object and specifies a respective measure of similarity between each pairwise combination of the semantic exemplars identified within the textual data;
computing, by the computing device and based at least in part on the data structure, a level of incongruity for the digital object that represents a predicted estimation of interest of the digital object to a user and from a function that quantifies joint presence of semantic diversity and semantic anomalousness; and
executing a programmatic action based on the computed level of incongruity for the digital object, wherein executing the programming action comprises outputting, by the computing device, an indication of the level of incongruity for the digital object.

2. The method of claim 1, wherein generating the data structure that represents the semantic space for the digital object comprises:
for each pairwise combination of the semantic exemplars, the pairwise combination including a first semantic exemplar and a second semantic exemplar, determining the respective measure of similarity between the pairwise combination by accessing an index generated based on a set of resource objects and computing, using the index, a respective co-occurrence, in the set of resource objects, of the first and second semantic exemplars, and
generating, based at least in part on the respective co-occurrence between each pairwise combination of the semantic exemplars, a similarity matrix for the digital object, the similarity matrix representing the semantic space,
wherein rows of the similarity matrix each represent a first instance of a respective semantic exemplar from the one or more semantic exemplars, wherein columns of the similarity matrix each represent a second instance of the respective semantic exemplar, and wherein each value within the similarity matrix indicates the respective measure of similarity between the semantic exemplars represented by a row and column that each corresponds to the value.

3. The method of claim 1, wherein computing the level of incongruity for the digital object comprises:
computing, based on the respective measure of similarity between each pairwise combination of the semantic exemplars, a level of semantic diversity for the digital object by identifying a minimum measure of similarity such that, for at least one semantic exemplar from the one or more semantic exemplars, the respective measure of similarity between each pairwise combination that includes the at least one semantic exemplar is less than or equal to the minimum measure of similarity;
computing, based on the respective measure of similarity between each pairwise combination of the semantic exemplars, a level of semantic anomalousness for the digital object by computing, for each of the one or more semantic exemplars, a respective divergence score and determining, based on the respective divergence score for each of the one or more semantic exemplars, a number of anomalous semantic exemplars; and
computing the level of incongruity for the digital object as a function of both the level of semantic diversity and the level of semantic anomalousness.

4. The method of claim 3, wherein computing the respective divergence score for each of the one or more semantic exemplars comprises computing, for a particular semantic exemplar, the sum of each respective measure of similarity between the particular semantic exemplar and each semantic exemplar from the one or more semantic exemplars, and
wherein determining the number of anomalous semantic exemplars comprises determining semantic exemplars that have a respective divergence score above an upper bound and semantic exemplars that have a respective divergence score below a lower bound, wherein the upper bound and the lower bound are each determined based on an inter-quartile range of the respective divergence score for each of the one or more semantic exemplars.

5. The method of claim 1, wherein determining the level of incongruity for the digital object further comprises determining, based on the data structure that represents the semantic space for the digital object, the presence of a loosely knit sense-cluster.

6. The method of claim 1, wherein determining the level of incongruity for the digital object further comprises determining, based on the data structure that represents the semantic space for the digital object, the presence of one or more anomalies in the semantic space.

7. The method of claim 1, further comprising:
receiving, by the computing device, a set of search terms having at least one search term;
executing a search to identify, based at least in part on the at least one search term, a set of digital objects relevant to the at least one search term, each of the set of digital objects having a computed relevance score, and each of the set of digital objects being associated with respective one or more semantic exemplars, wherein the digital object comprises one of the set of digital objects; and
processing each of the identified digital objects to determine, based at least in part on the respective one or more semantic exemplars for each of the set of digital objects, a respective level of incongruity for each of the set of digital objects.

8. The method of claim 7, wherein executing the search comprises:
sending, to a search engine, a search query that includes the at least one search term; and
responsive to sending the search query, receiving, from the search engine, the set of digital objects.

9. The method of claim 7, further comprising:
determining a respective summarization of each digital object from the set of digital objects, the respective summarization comprising respective one or more summary terms, wherein the respective one or more semantic exemplars associated with each digital object comprise the respective one or more summary terms; and
computing the level of incongruity for each of the digital objects based on the respective summarization of each of the digital objects.

10. The method of claim 7, wherein the respective one or more semantic exemplars for each of the set of digital objects comprises the at least one search term.

11. The method of claim 7, wherein the at least one search term comprises at least one first search term, wherein the set of digital objects comprises a first set of digital objects, and wherein outputting the indication of the respective level of incongruity for the at least one digital object comprises outputting a first indication of the respective level of incongruity for at least one first digital object from the first set of digital objects, the method further comprising:
receiving, by the computing device, an indication of input to select a specified digital object from the first set of digital objects;
determining, by the computing device and based at least in part on the at least one first search term and the specified digital object, at least one second search term;
updating the set of search terms to include the second search term and executing a second search to identify, based at least in part on the updated set of search terms, a second set of digital objects relevant to the at least one second search term, each of the second set of digital objects having a computed relevance score, each of the second set of digital objects being associated with respective one or more semantic exemplars; and
processing each of the identified digital objects to determine, based at least in part on the respective one or more semantic exemplars for each of the second set of digital objects, a respective level of incongruity for each of the second set of digital objects.

12. The method of claim 1, wherein outputting, by the computing device, an indication of the level of incongruity for the digital object comprises determining a set of one or more search results including the digital object and outputting the set of search results.

13. The method of claim 1, wherein the digital object comprises at least one of: a digital communication, a webpage, or video data and wherein the one or more semantic exemplars comprise at least one of: one or more words, or one or more tags.

14. The method of claim 1, further comprising determining at least one of the one or more semantic exemplars based on metadata associated with the digital object.

15. The method of claim 1, wherein outputting the indication of the computed level of incongruity comprises scoring, based on the level of incongruity, the digital object as one of a set of one or more search results and outputting the set of search results.

16. The method of claim 1, wherein outputting the indication of the computed level of incongruity comprises outputting a report or data for display.

17. The method of claim 1, wherein outputting the indication of the computed level of incongruity comprises outputting a set of suggested material for a user.

18. A computing device, comprising:
at least one processor; and
at least one module operable by the at least one processor to:
process textual data associated with a digital object to identify within the textual data one or more semantic exemplars for the digital object;
generate a data structure that represents a semantic space of semantic diversity and semantic anomalousness for the digital object and specifies a respective measure of similarity between each pairwise combination of the semantic exemplars identified within the textual data;
compute, based at least in part on the data structure, a level of incongruity for the digital object that represents a predicted estimation of interest of the digital object to a user and from a function that quantifies joint presence of semantic diversity and semantic anomalousness; and
execute a programmatic action based on the computed level of incongruity for the digital object, wherein the programming action comprises outputting, by the computing device, an indication of the level of incongruity for the digital object.

19. The computing device of claim 18, wherein the at least one module operable to generate the data structure that represents the semantic space for the digital object is operable by the at least one processor to:
for each pairwise combination of the semantic exemplars, the pairwise combination including a first semantic exemplar and a second semantic exemplar, determine the respective measure of similarity between the pairwise combination by accessing an index generated based on a set of resource objects and computing, using the index, a respective co-occurrence, in the set of resource objects, of the first and second semantic exemplars, and generate, based at least in part on the respective co-occurrence between each pairwise combination of the semantic exemplars, a similarity matrix for the digital object, the similarity matrix representing the semantic space, wherein rows of the similarity matrix each represent a first instance of a respective semantic exemplar from the one or more semantic exemplars, wherein columns of the similarity matrix each represent a second instance of the respective semantic exemplar, and wherein each value within the similarity matrix indicates the respective measure of similarity between the semantic exemplars represented by a row and column that each corresponds to the value.

20. The computing device of claim 18, wherein the at least one module operable to determine the level of incongruity for the digital object is operable by the at least one processor to:

compute, based on the respective measure of similarity between each pairwise combination of the semantic exemplars, a level of semantic diversity for the digital object by identifying a minimum measure of similarity such that, for at least one semantic exemplar from the one or more semantic exemplars, the respective measure of similarity between each pairwise combination that includes the at least one semantic exemplar is less than or equal to the minimum measure of similarity;

compute, based on the respective measure of similarity between each pairwise combination of the semantic exemplars, a level of semantic anomalousness for the digital object by computing, for each of the one or more semantic exemplars, a respective divergence score and determining, based on the respective divergence score for each of the one or more semantic exemplars, a number of anomalous semantic exemplars; and compute the level of incongruity for the digital object as a function of both the level of semantic diversity and the level of semantic anomalousness.

21. The computing device of claim 20, wherein the at least one module operable to compute the respective divergence score for each of the one or more semantic exemplars is operable by the at least one processor to compute, for a particular semantic exemplar, the sum of each respective measure of similarity between the particular semantic exemplar and each semantic exemplar from the one or more semantic exemplars, and wherein the at least one module operable to determine the number of anomalous semantic exemplars is operable by the at least one processor to determine semantic exemplars that have a respective divergence score above an upper bound and semantic exemplars that have a respective divergence score below a lower bound, wherein the upper bound and the lower bound are each determined based on an inter-quartile range of the respective divergence score for each of the one or more semantic exemplars.

22. The computing device of claim 18, wherein the at least one module is further operable by the at least one processor to:

receive a set of search terms having at least one search term;

execute a search to identify, based at least in part on the at least one search term, a set of digital objects relevant to the at least one search term, each of the set of digital objects having a computed relevance score, and each of the set of digital objects being associated with respective one or more semantic exemplars, wherein the digital object comprises one of the set of digital objects; and process each of the identified digital objects to determine, based at least in part on the respective one or more semantic exemplars for each of the set of digital objects, a respective level of incongruity for each of the set of digital objects.

23. The computing device of claim 18, wherein outputting the indication of the computed level of incongruity comprises scoring, by the computing device based on the level of incongruity, the digital object as one of a set of one or more search results and outputting the set of search results.

24. The computing device of claim 18, wherein outputting the indication of the computed level of incongruity comprises outputting a report or data for display.

25. The computing device of claim 18, wherein outputting the indication of the computed level of incongruity comprises outputting a set of suggested material for a user.

26. A non-transitory computer-readable storage medium encoded with instructions that, when executed, cause at least one processor to:

process textual data associated with a digital object to identify within the textual data one or more semantic exemplars for the digital object;

generate a data structure that represents a semantic space of semantic diversity and semantic anomalousness for the digital object and specifies a respective measure of similarity between each pairwise combination of the semantic exemplars identified within the textual data;

compute, based at least in part on the data structure, a level of incongruity for the digital object that represents a predicted estimation of interest of the digital object to a user and from combination of a score of semantic diversity and a score of semantic anomalousness; and execute a programmatic action based on the computed level of incongruity for the digital object, wherein the programming action comprises outputting an indication of the level of incongruity for the digital object.

27. The computer-readable storage medium of claim 26, wherein outputting the indication of the computed level of incongruity comprises scoring, based on the level of incongruity, the digital object as one of a set of one or more search results and outputting the set of search results.

28. The computer-readable storage medium of claim 26, wherein outputting the indication of the computed level of incongruity comprises outputting a report or data for display.

29. The computer-readable storage medium of claim 26, wherein outputting the indication of the computed level of incongruity comprises outputting a set of suggested material for a user.

* * * * *